Patented Dec. 27, 1949

2,492,710

UNITED STATES PATENT OFFICE 2,492,710

BASIC BISMUTH PARA AMINO BENZOATE

Clarence W. Peake, Baltimore, and Edwin M. Glocker, Catonsville, Md., assignors of three-fourths to said Peake and one-fourth to said Glocker No Drawing. Application March 8, 1946, Serial No. 653,133

1 Claim. (Cl. 260—447)

This invention relates to pharmaceutical materials and more particularly to bismuth salts of aminobenzoic acid and to methods of making the same.

Among the objects of the present invention is the preparation of bismuth salts, particularly of para aminobenzoic acid suitable for use for injection.

Other and further objects of this invention will appear from the more detailed description set forth below it being understood that such more detailed description is given by way of illustration and explanation only, and not by way of limitation, since various changes therein may be made by those skilled in the art without departing from the scope and spirit of the present invention.

In accordance with the present invention, new compounds are produced, particularly a bismuth salt of para aminobenzoic acid. Such salts may be produced in any desired way, as for example, by carrying out a reaction between bismuth oxide and para aminobenzoic acid. The reaction is desirably carried out by heating the stated reactants desirably at fairly elevated temperatures, as for example, of the order of about 200° C., or from 190 to 205° C.

The ratio of the reactants may vary but for producing the preferred specific compound basic bismuth para aminobenzoate having the formula:

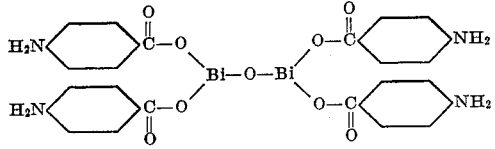

for this purpose desirably a ratio of 1 gram atom of bismuth to 2 gram mols of para aminobenzoic acid is utilized representing a molal ratio of 1 to 4 on the basis of $Bi_2O_3$ and $NH_2C_6H_4COOH$ respectively.

As a specific example of preparing the preferred salts, 1 part by weight of bismuth oxide is reacted with 2 parts by weight of para aminobenzoic acid at a temperature of about 200° C. The ratios given provide for an excess of para aminobenzoic acid. The reaction mixture obtained may be purified in any way, as for example, after the mixture has cooled, a suitable solvent such as 95% ethyl alcohol is added. The material remaining after solvent extraction consists of basic bismuth para aminobenzoate of the formula set forth above.

The theoretical percentage of $Bi_2O_3$ in such compound should be .475%. Practically, as in the case with other organic bismuth compounds the percentage figure will vary somewhat ranging from about .475 to .502%.

The material obtained as set forth above is crystalline and usually in the form of microscopic prisms, which vary slightly as to both size and shape. These prisms are insoluble in water and in 95% alcohol, but are readily soluble with chemical decomposition in acids. Grossly, the product is a grayish-brown powder, turning slightly yellow on exposure to light.

The material may be used pharmaceutically for injection purposes in which event it is suspended in a suitable injection oil such as sesame or peanut oil, and administered as an intramuscular injection.

The bismuth para aminobenzoate produced in accordance with the present invention has been used successfully in the following clinical conditions: acute rheumatic fever, and it appears to be a chemical specific for this condition; acute rheumatoid arthritis; acute streptococcic infections such as tonsillitis; chronic streptococcic infections such as adenitis; acute staphylococcic infections such as boils and carbuncles; and in numerous other conditions caused by bacteria, and some of which are caused by viruses.

While proportions of the reactants may vary, desirably for production of materials for pharmaceutical use, the para-aminobenzoic acid should be present in excess.

As to the extracting agent employed for extracting the reaction product, alcohol alone may be used or any other organic liquid which has the requisite properties.

In lieu of para-aminobenzoic acid, its substituted derivatives may be employed so long as no substituent group is present which interferes with the properties desired. Simple nuclear substituents may thus be present.

Having thus set forth our invention, we claim:

A composition containing a bismuth salt of para aminobenzoic acid having the formula:

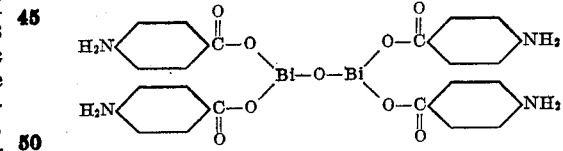

CLARENCE W. PEAKE.
EDWIN M. GLOCKER.

(References on following page)

REFERENCES CITED

The following references are of record in the file of this patent:

UNITED STATES PATENTS

| Number | Name | Date |
|---|---|---|
| 809,583 | Seifert | Jan. 9, 1906 |
| 958,110 | Gruttefien | May 17, 1910 |
| 1,540,117 | Gremsa | June 2, 1925 |
| 1,921,638 | Raiziss et al. | Aug. 8, 1933 |
| 2,061,320 | Hampe et al. | Nov. 17, 1935 |
| 2,090,201 | Herrmann et al. | Aug. 17, 1937 |
| 2,148,763 | Lyons | Feb. 28, 1939 |

OTHER REFERENCES

New and Nonofficial Remedies, 1944, pages 232, 233, A. M. A. Chicago 1944.